Patented July 1, 1941

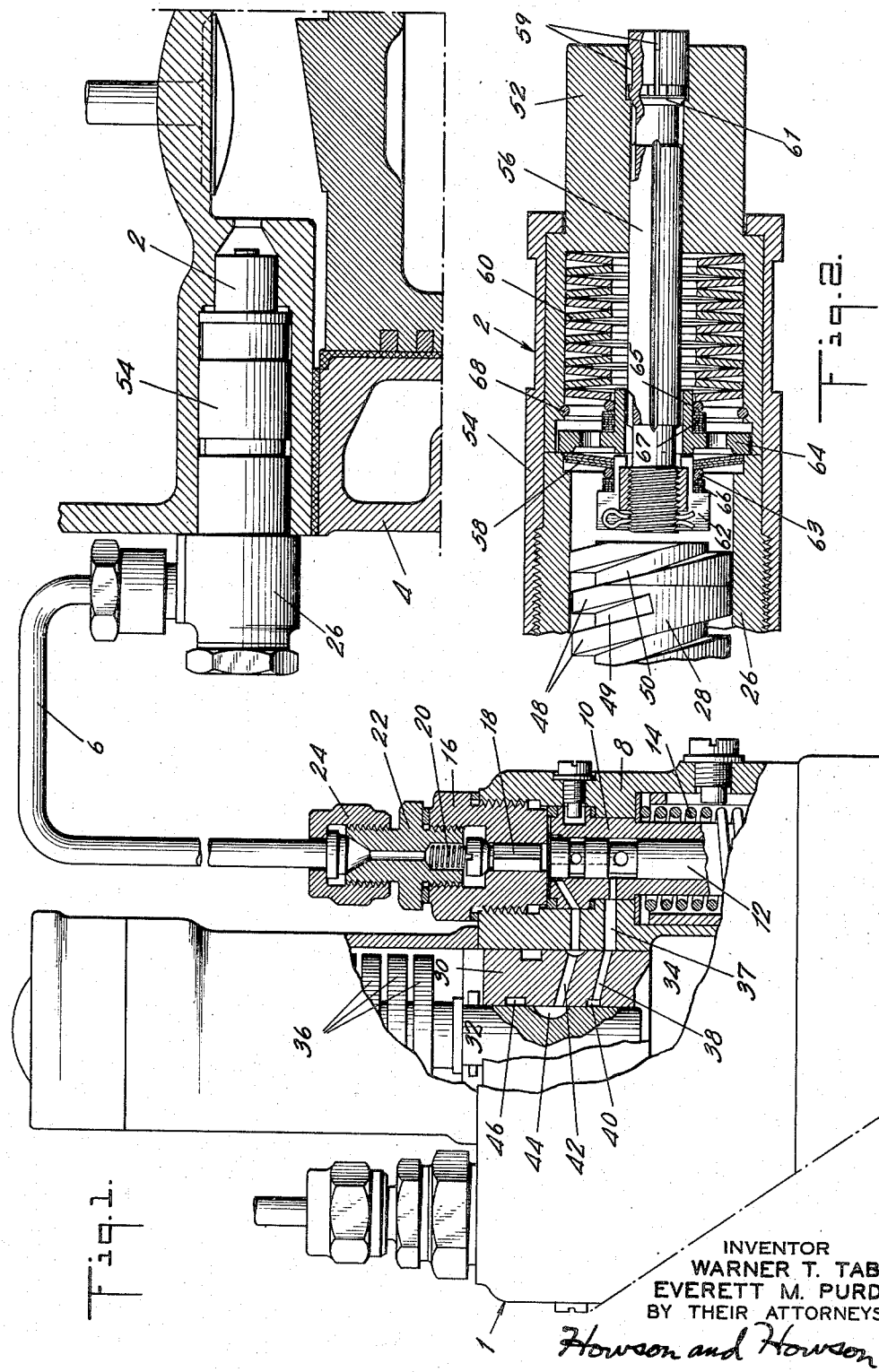

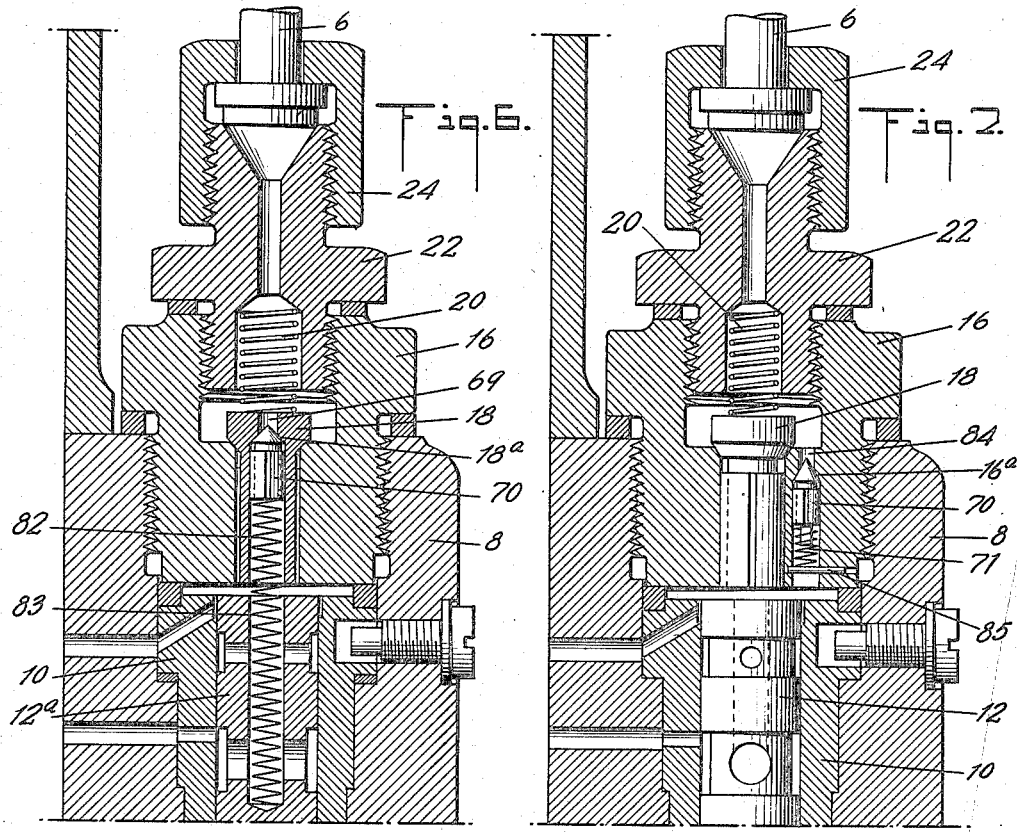
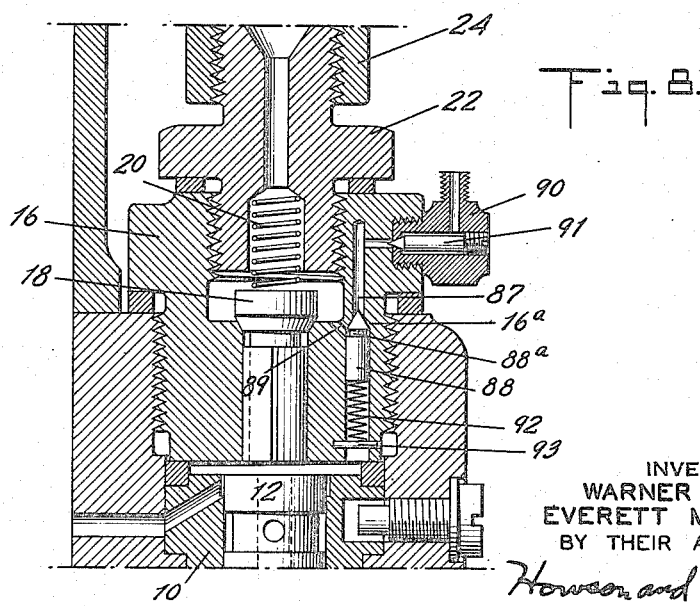

2,247,421

UNITED STATES PATENT OFFICE 2,247,421

PRESSURE REGULATOR FOR FUEL INJECTION SYSTEMS FOR INTERNAL COMBUSTION ENGINES

Warner T. Tabb, Brooklyn, N. Y., and Everett M. Purdy, New Canaan, Conn., assignors to Eisemann Magneto Corporation, New York, N. Y., a corporation of New York Application June 18, 1938, Serial No. 214,556

13 Claims. (Cl. 123—139)

This invention relates to fuel injection systems for internal combustion engines and more particularly to means for reducing the pressure on the valve of the nozzle of a fuel injection system to a predetermined value so as to prevent leakage or discharge from the nozzle at all times except when fuel is being injected into the engine cylinder and it is an object of this invention to provide means for relieving the pressure on the nozzle which will operate promptly and efficiently; which does not vent pressure during the period fuel is being injected into the engine cylinder and which is so related to the operation of the fuel injection pump with which it is associated that it will be operated to relieve the pressure on the nozzle immediately the pressure at the pump is reduced to stop the discharge at the nozzle and will insure uniform pressures in the nozzle for the beginning of each injection stroke of the pump.

In the drawings:

Figure 1 is a partial view, partly in section and partly in elevation of parts of a fuel injection system in accordance with this invention;

Figure 2 is a partial longitudinal sectional view of the fuel injection nozzle shown in Figure 1;

Figures 5, 6, 7 and 8 are views similar to Figure 3 of modified forms of pressure relieving means in accordance with this invention.

Figure 3:
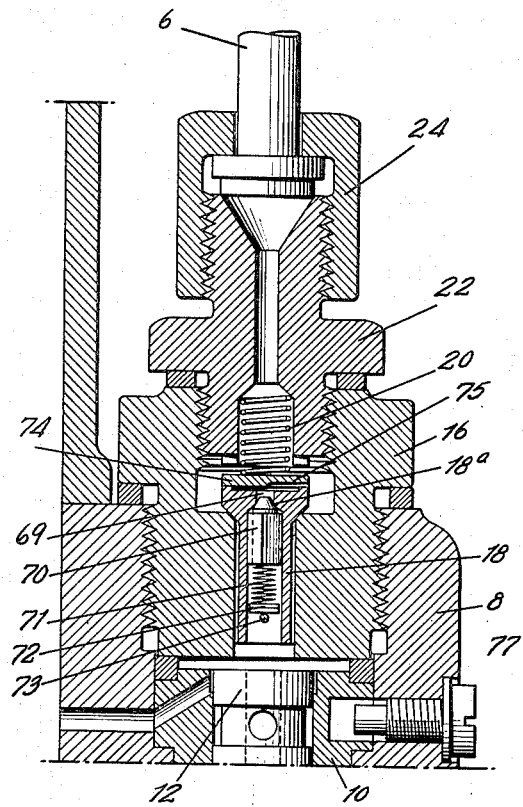
Figure 3 is a partial vertical sectional view of the fuel pump shown in Figure 1 showing applied thereto the preferred form of the means for relieving the pressure on the fuel nozzle in accordance with this invention.

In the drawings the invention is shown in connection with a fuel injection system comprising a fuel injection pump 1, and a nozzle 2 mounted in an engine cylinder 4 and connected to the pump 1 by a pipe or delivery conduit 6. The pump 1 shown is of a construction for supplying fuel to a plurality of engine cylinders and comprises a casing 8 having a plurality of bores formed therein and arranged in a circle about the axis of the casing. Fitted in each bore is a sleeve or bushing 10 which forms a cylinder for a pump plunger 12 arranged to be reciprocated by a cam (not shown) rotated about the axis of the casing 8 and a spring 14. The bores open to the upper end of the casing 8 and each bore is closed by a threaded plug 16 having an opening extending therethrough which is shaped, intermediate its ends to form a seat for a check valve 18. The valve 18 is held to its seat by a spring 20 confined between the valve 18 and a plug 22 which is threaded in the opening in the plug 16. The plug 22 has an opening which extends therethrough and completes the connection from the chamber in the bushing 10 above the pump plunger 12 through the plug 16 to the pipe 6, one end of which pipe is secured to the plug 22 by a collar 24 while the opposite end of the pipe is connected to a casing 26 so as to supply fuel through a filter 28 and fuel nozzle 2 to the engine cylinder 4.

The casing 8 is also provided with an axially positioned bore in which is fitted a bushing 30 forming a seat for a valve 32 arranged to be operated by a spring 36 and a speed responsive means 34 driven by the engine. The bushing 30 is shown as provided with a passage 38 through which fuel which leaks along the valve is returned from an annular passage 40 to the annular fuel chamber 37 in the casing 8 from which fuel is supplied to each pump cylinder and to which fuel is vented from each pump cylinder to stop fuel injection by the spray nozzles 2. The bushing 30 is also provided with passages 42 which are connected to the pump plunger bores and which are connected, to a greater or lesser extent, by the ports 44 in the valve 32 to an annular passage 46 in the bushing 30 for the venting of fuel under pressure from in front of the pump plunger 12 to the fuel container during each pumping stroke, passage 46 being connected to the fuel container by passages not shown.

The filter 28 is shown as of the type in which the fuel is filtered by passing through the leak opening between the threads 48 and the casing 26, the threads separating a groove 49 which is open at one end to receive fuel from the pipe 6 from the groove 50 which is open at the other end to discharge the fuel to the nozzle 2. The nozzle 2 is shown as comprising a nozzle tip 52 which is secured to the casing 26 by a sleeve 54 and which is provided with a central bore to receive a stem 56, the bore being enlarged at its inner end to form, with the casing 26, a chamber in which are placed the springs 58 and 60, shown as annular disk springs surrounding the stem 56, which oppose the operation of the stem 56 to discharge fuel from the nozzle 2. At its outer end the stem 56 is enlarged slightly, fitting a correspondingly enlarged portion of the bore in the tip 52 and the enlarged portion of the stem is slotted, as at 59, to permit the discharge of fuel. Adjacent the enlarged portion the stem 56 is formed with a valve portion 61 which cooperates with a seat formed in the bore in the tip 52 in preventing discharge from the nozzle. At its inner end the stem 56 is threaded to receive a nut 62 which extends through the openings of the disks of spring 58, is slotted to permit the passage of fuel through the spring 58 and is shouldered to hold the wire ring 63 which bears on the inner edge of the spring 58. The outer edge of the spring 58 bears against a flanged collar 64 which is mounted on the stem 56. The collar 64 is shouldered to hold the wire ring 65 which forms a seat for the inner edge of one end of the spring 60, the outer edge of the other end of which bears against the nozzle tip 2. The spring 60 is held under initial compression by the collar 64 engaging the end of the casing 26 and the spring 58 is held under initial compression by the nut 62, the extent to which the springs 58 and 60 are initially stressed being adjusted preferably by the use of shims or washers 66 and 67, respectively. A wire ring 68 retains the disks of spring 68 in position in the tip 52 upon removal of the collar 64 and stem 56.

The nut 62 has a portion positioned to engage the collar 64 upon a predetermined deflection of the spring 58, permitting a predetermined opening of the valve 61 opposed solely by the resistance of spring 58 and after nut 62 engages collar 64 further deflection of the spring 58 is prevented and further opening of the valve 61 is opposed by the resistance of spring 60 only, the spring 60 permitting a gradual increase in the opening of the valve 61 with a gradual increase in the fuel pressure.

With a fuel injection system such as described above, operation of the plunger 12 by its cam causes the fuel in the chamber above the plunger to be placed under pressure, a governed quantity of the fuel escaping during the fuel delivery stroke through passage 42 and port 44 and some being forced past the check valve 18 into the pipe 6, raising the pressure of pipe 6 until the resistance of spring 58 is overcome and valve 61 is opened to discharge fuel to the engine cylinder. Continued movement of the plunger 12 raises the fuel pressure sufficiently to deflect spring 58 until nut 62 engages collar 64 and spring 60 is also deflected. Movement of the plunger 12 carries it to the position shown in Figure 1 in which fuel under pressure is vented from in front of the plunger 12 to the passage 38 to reduce the pressure of the fuel sufficiently to permit the valve 61 to close cutting off the discharge from the nozzle 2. Venting the fuel from in front of the plunger 12 reduces the pressure opening the check valve 18, permitting the spring 20 and the fuel under pressure in the pipe 6 to seat the valve 18, retaining in the pipe 6 fuel under a considerable pressure. During the operation of the engine from the end of one fuel injection to the beginning of the next the pressure in the engine cylinder opposing operation of the valve 61 varies throughout a considerable range and this variation in cylinder pressure, combined with the pressure of the fuel retained in the pipe 6, is often sufficient to cause a slight opening of the valve 61 and a resulting undesirable leakage of the fuel from the pipe 6 to the engine cylinder. To prevent this leakage from the pipe 6, it is desirable that means be provided which will reduce the pressure of the fuel in pipe 6 sufficiently to prevent leakage from the nozzle 2 while retaining the fuel in the pipe 6 under such pressure that fuel injection takes place in the proper amount during each injection period both during the operation of the engine under load and during idling of the engine.

To insure the pressure of the fuel in pipe 6 being reduced sufficiently to prevent leakage from the nozzle 2 while preventing it from being reduced sufficiently to cause irregularity of fuel injection, the check valve 18, as shown in Figure 3, is bored to provide a passage 69 therethrough and a seat 18a for a check valve 70 mounted in the passage 69, the valve 70 being arranged so as to be opened by pressure from the pipe 6 and biased to closed position by a spring 71 confined between the valve 70 and a spring seat 72 held in position by a pin 73 mounted in the valve 18. To limit the flow of fuel to the valve 70 from the pipe 6 there is supported on the valve 18, between the valve 18 and its spring 20, a removable plate 74 which is positioned on the top of the valve 18 in any suitable manner, and is grooved or notched, as at 75, to provide a passage of limited capacity extending inwardly from an edge of the plate 74 to a point over the passage 69 in the valve 18. The valve 70 will be subjected to the pressure of the fuel in front of the piston 12, as well as to the action of the spring 71, and will be held seated throughout the pumping or injection period of the plunger movement, that is, while the valve 18 is held open. Upon the venting of fuel under pressure from in front of the pump plunger 12 in order to stop the injection of fuel into the engine cylinder, the valve 18 seats and the valve 70 is subjected on one side to the pressure of the fuel retained in the pipe 6 and on the other side to the pressure of the spring 71 and the pressure of the fuel in front of the plunger 12 which at this time has been reduced, so that an unbalanced pressure acts on the valve 70, opening the valve to vent fuel from the pipe 6 to the chamber in front of the plunger 12. The rate at which the fuel is vented will be governed by the notch 75 in the plate 74 and the extent to which the pressure of the fuel in the pipe 6 is reduced can be controlled by providing a spring 71 of sufficient strength to retain the desired pressure in the pipe 6.

Figure 5:
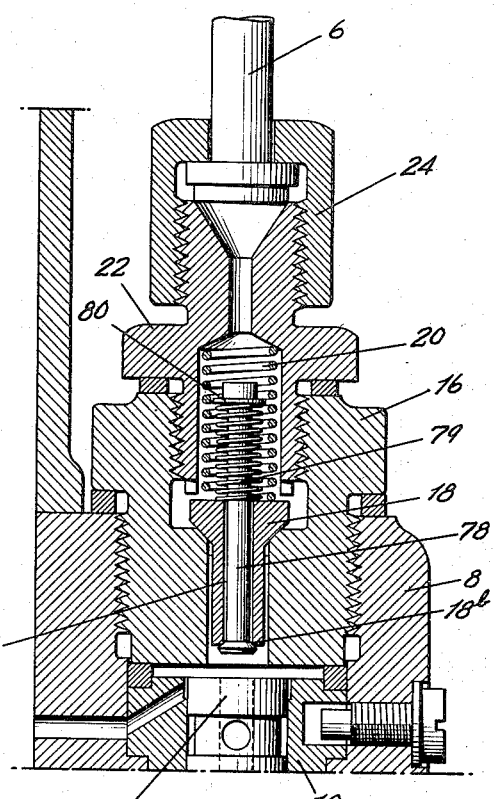
Figure 4:
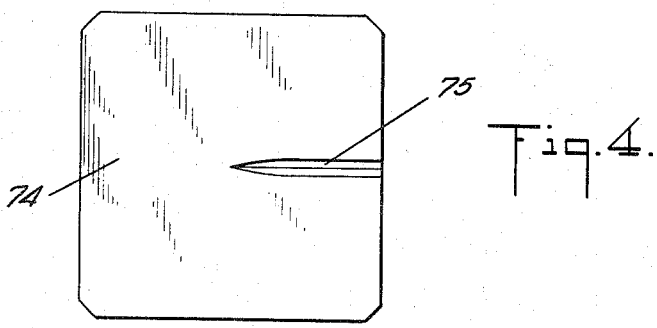
Figure 4 is a bottom plan view of a washer for restricting the flow of fuel through the pressure relieving means shown in Figure 3.

In the modified construction shown in Figure 5, the valve 18 is centrally bored to provide a passage 77 and the bore is enlarged at its lower end to provide a seat 18b for a valve 78 inserted in the passage 77 and biased to closed position by a spring 79 which surrounds the valve 78 and is confined between the valve 18 and a collar or washer 80 secured on the valve 78. In this construction the valve 78 is held closed by the spring 79 and the pressure of the fuel above the pump plunger 12 during the injection period and when fuel is vented from above the plunger 12 to stop the fuel injection to the engine cylinder the valve 18 is seated and the valve 78 is opened by the excess of the pressure of the fuel retained in the pipe 6 over the combined action of the spring 79 and the pressure of the fuel in front of the plunger 12. The pressure of the fuel retained in the pipe 6 can be controlled by proportioning the strength of the spring 78 and the discharge of fuel past the valve 78 is limited or restricted by having the valve 78 fit snugly in the passage 77 and by providing only a fine groove or a narrow flat portion on the valve 78 to provide a passage for fuel through the valve 18.

In the modification shown in Figure 6 the valve 18 is provided with a bore 69 to receive a valve 70, the bore being shaped to provide a seat 18a for the valve. The valve 70 is biased to closed position by a spring 82 which is of sufficient length to project beyond the valve 18 and engage in a bore 83 formed in the pump plunger 12a. The bore 83 may be an enlargement of the central bore of the plunger 12a which establishes communication from the chamber in front of the plunger to the annular recesses formed in the plunger and connecting with the port 38 for the supply of fuel to and the venting of fuel from the chamber in front of the plunger. In this construction the operation of the plunger 12a causes the spring 82 to be compressed and expanded, thus providing an increase in the spring pressure during the fuel injection stroke of the plunger and a decrease in the pressure exerted by the spring and a decrease in the pressure of the fuel retained by the valve 70, as the plunger 12a is drawn back after fuel has been vented from in front of the plunger. As in the other constructions the pressure of the fuel retained in the pipe 6 can be controlled by proportioning the strength of the spring 82.

In the modification shown in Figure 7 there is provided a bore 84 in the plug 16 which forms a by-pass around the valve 18, the bore 84 being shaped to form a seat 16a for a valve 70 mounted in the bore 84 and biased to closed position by a spring 71 confined between the valve 70 and a spring seat 85 mounted in the plug 16. The valve of this construction is subjected to the pressure of the fuel above the pump plunger 12 as well as to the action of the spring 71 and is held closed during the fuel injection period. Upon venting of fuel from in front of the plunger 12 the valve 70 is opened as in the other constructions.

In the modification shown in Figure 8 the plug 16 is provided with a bore 87 open to the chamber in front of the pump plunger 12; enlarged for a portion of its length to receive a valve 88; and shaped to provide a seat 16a for the valve. Adjacent the valve 16a the bore 87 is connected to the chamber above valve 18 by a port 89 and at its upper end the bore 87 is connected by passages extending through a plug 90 to a connection extending to a fuel receptacle (not shown). The plug 90 is shaped to receive a needle valve 91, threaded into the plug 90 and adjustable to control the discharge from the bore 87. The valve 88 is of such size as to snugly fit the bore 87 while permitting movement of the valve therein and is formed with an annular recess 88a adjacent the seat engaging portion of the valve which is open to the chamber above valve 18 through port 89 and provides an unbalanced area subjected to the pressure of the fuel in the chamber above the valve 18 and in pipe 6 in a direction to unseat the valve 88 and open the bore 87 for a discharge of fuel past the needle valve 91 to the fuel receptacle. A spring 92 confined between the valve 88 and a spring seat 93 mounted in the plug 16 biases the valve 88 to closed position.

In this modification the valve 88 is held closed during the injection period by the pressures of the spring 92 and the fuel in front of the plunger 12 and upon the venting of fuel from the chamber in front of the plunger 12 the pressure of the fuel retained in the pipe 6 on the unbalanced area of the valve 88 at the groove or recess 88a causes the valve to be unseated for the discharge of fuel from the pipe 6 through bore 87 and past the valve 91 until the pressure is reduced sufficiently for the spring 92 and the pressure of the fuel in advance of the plunger 12 to overcome the pressure of the fuel retained in pipe 6 and acting upon the valve 88.

We claim:

1. In fuel injection equipment for internal combustion engines, a nozzle having a discharge orifice, pump means for delivering fuel to said nozzle orifice, means connecting said pump and nozzle, valve means for preventing back flow of fuel from said nozzle to said pump, a second valve means controlled by the difference in the pressures on opposite sides of said first valve for permitting back flow from said nozzle and a plate having a fuel passage therein restricting the flow permitted by said second valve.

2. In fuel injection equipment for internal combustion engines, a nozzle having a discharge orifice, pump means for delivering fuel to said nozzle orifice, means connecting said pump and nozzle, valve means for preventing back flow of fuel from said nozzle to said pump, a second valve means controlled by the difference in the pressures on opposite sides of said first valve for permitting back flow from said nozzle and means restricting the flow permitted by said second valve.

3. In fuel injection equipment for internal combustion engines, a pump, a conduit for delivery of fuel from said pump to an engine cylinder, valve means for venting fuel from said conduit when the pressure in said conduit exceeds the pressure in said pump by a predetermined amount and means for restricting the rate of discharge by said valve.

4. In fuel injection equipment for internal combustion engines, a fuel pump, a discharge nozzle, means connecting said pump and nozzle, a valve in said connecting means preventing back flow to said pump, means responsive to the pressures of fuel in said pump and said connecting means controlling the venting of fuel from said connecting means and means limiting the rate of discharge of fuel by said venting control means.

5. In fuel injection equipment for internal combustion engines, a fuel pump, a discharge nozzle, means connecting said pump and nozzle, a valve in said connecting means preventing back flow to said pump, means responsive to a difference in the pressures of fuel on opposite sides of said valve controlling the venting of fuel from said connecting means and means restricting the venting of fuel by said venting control means.

6. In fuel injection equipment for internal combustion engines comprising a nozzle having a discharge orifice, pump means to deliver periodically fluid under high pressure to said orifice, means comprising a system of chambers and passages connecting said pump and nozzle and constituting the high pressure fluid system of said equipment, a valve controlled by the difference in pressure between two portions of said high pressure system and controlling the pressure drop within a portion of said high pressure system between the periodic rises in pressure associated with the discharge of fuel from said orifice, said valve being opened by a pressure difference in a direction reverse to that inducing flow to said nozzle orifice to permit escape of fluid from said portion of said high pressure system and throttling means to limit the rapidity of escape of fluid from said portion of said high pressure system.

7. In fuel injection equipment for internal combustion engines comprising a nozzle having a discharge orifice, pump means to deliver periodically fluid under high pressure to said orifice, means comprising a system of chambers and passages connecting said pump and nozzle and constituting the high pressure fluid system of said equipment, a valve controlled by the difference in pressure between two portions of said high pressure system and controlling the pressure drop within a portion of said high pressure system between the periodic rises in pressure associated with the discharge of fuel from said orifice, said valve being opened by a pressure difference in a direction reverse to that inducing flow to said nozzle orifice to permit escape of fluid from said portion of said high pressure system to the supply for said pump and throttling means to limit the rapidity of escape of fluid from said portion of said high pressure system.

8. In fuel injection equipment for internal combustion engines, a fuel pump having a plunger and formed with a discharge passage in line with said plunger, a fuel discharge nozzle, fuel conveying means connecting said pump passage to said nozzle and arranged to have at least an initial portion in line with said pump discharge passage, a valve in said pump discharge passage for preventing backflow to said pump, means forming a channel for passing a relief discharge of fuel from said fuel conveying means, and a second valve controlling said channel and responsive to the difference in pressures of fuel in said pump passage and in said fuel conveying means and opening when the pressure in said pump passage is dropped to a predetermined value.

9. In fuel injection equipment for internal combustion engines, a fuel pump having a plunger and formed with a discharge passage in line with said plunger, a fuel discharge nozzle, fuel conveying means connecting said pump passage to said nozzle and arranged to have at least an initial portion in line with said pump discharge passage, a valve in said pump discharge passage for preventing backflow to said pump, means forming a channel for passing a relief discharge of fuel from said fuel conveying means, a second valve controlling said channel and responsive to the difference in pressures of fuel in said pump passage and in said fuel conveying means and opening when the pressure in said pump passage is dropped to a predetermined value, and means for restricting the rate of flow in said relief discharge passage.

10. In fuel injection equipment for internal combustion engines, a fuel pump having a plunger and formed with a discharge passage in line with said plunger, a fuel discharge nozzle, fuel conveying means connecting said pump passage to said nozzle and arranged to have at least an initial portion in line with said pump discharge passage, a valve in said pump discharge passage for preventing backflow to said pump, means including a channel portion through said first-named valve for passing a relief discharge from said fuel conveying means, and a second valve controlling said channel in said first-named valve and arranged to respond to the differential in pressures in said fuel conveying means and in said pump discharge passage.

11. In fuel injection equipment for internal combustion engines, a fuel pump having a plunger and formed with a discharge passage having a discharge receiving chamber, a fuel discharge nozzle, fuel conveying means connecting said chamber to said nozzle, a valve for controlling said pump discharge passage and preventing backflow to said pump, means forming a channel in parallel to said pump discharge passage for accommodating a relief discharge from said fuel conveying means, a second valve controlling said channel responsive to the differential in pressures in said chamber and in said pump discharge passage, and means for regulating the rate of flow in said channel.

12. In fuel injection equipment for internal combustion engines, a fuel pump having a plunger and formed with a discharge passage, a fuel discharge nozzle, fuel conveying means connecting said pump and said nozzle, a valve in said fuel conveying means preventing backflow to said pump, means forming a relief discharge passage including a channel through said first-named valve and leading from said fuel conveying means, a second valve mounted in said first-named valve controlling said channel, and spring means interposed between said pump plunger and said second valve and arranged upon advance of said plunger to provide spring pressure sufficient to prevent leakage past said second-named valve but permitting opening when said pump plunger has receded and lessened said spring pressure a predetermined amount.

13. In fuel injection equipment for internal combustion engines, a fuel pump comprising a casing provided with at least one plunger and communicating discharge passage, a fuel discharge nozzle, fuel conveying means connecting said discharge passage and said nozzle, a valve in said fuel conveying means preventing backflow to said pump, means forming a relief discharge passage including a channel leading from said fuel conveying means to the space ahead of said plunger, a second valve mounted for controlling said relief discharge passage, and spring means interposed between said pump plunger and said second valve and arranged upon advance of said plunger to provide spring pressure sufficient to prevent leakage past said second-named valve but permitting opening when said plunger has receded.

WARNER T. TABB.
EVERETT M. PURDY.